US012616340B2

(12) United States Patent
Itzkowitz et al.

(10) Patent No.: US 12,616,340 B2
(45) Date of Patent: May 5, 2026

(54) BLENDER

(71) Applicant: The Steelstone Group LLC, Brooklyn, NY (US)

(72) Inventors: Binyumen Itzkowitz, Brooklyn, NY (US); Meilech Friedman, Brooklyn, NY (US); Kalman Wertzberger, Brooklyn, NY (US); Robyn De Luca, Queens, NY (US); Wenhui Huang, Brooklyn, NY (US); Joseph Deutsch, Brooklyn, NY (US)

(73) Assignee: The Steelstone Group LLC, Brooklyn, NY (US)

( * ) Notice: Subject to any disclaimer, the term of this patent is extended or adjusted under 35 U.S.C. 154(b) by 357 days.

(21) Appl. No.: 18/538,831

(22) Filed: Dec. 13, 2023

(65) Prior Publication Data

US 2024/0206682 A1     Jun. 27, 2024

Related U.S. Application Data

(60) Provisional application No. 63/434,326, filed on Dec. 21, 2022.

(51) Int. Cl.
| | |
|---|---|
| *A47J 43/07* | (2006.01) |
| *A47J 43/046* | (2006.01) |
| *A47J 43/28* | (2006.01) |
| *B01F 27/091* | (2022.01) |
| *B01F 27/808* | (2022.01) |
| *B01F 101/06* | (2022.01) |

(52) U.S. Cl.
CPC ......... *A47J 43/0722* (2013.01); *A47J 43/046* (2013.01); *A47J 43/288* (2013.01); *B01F 27/091* (2022.01); *B01F 27/808* (2022.01); *B01F 2101/06* (2022.01)

(58) Field of Classification Search
CPC .. A47J 43/0722; A47J 43/0716; A47J 43/046; A47J 43/288; B01F 27/091; B01F 27/808
See application file for complete search history.

(56) References Cited

U.S. PATENT DOCUMENTS

| | | | | |
|---|---|---|---|---|
| 3,417,972 A | * | 12/1968 | Conway | .................. B01F 35/45 |
| | | | | 241/199.12 |
| 8,967,854 B2 | * | 3/2015 | Sand | ................. B01F 33/50115 |
| | | | | 366/192 |
| 9,084,513 B2 | * | 7/2015 | Simons | ................. A47J 43/288 |
| 9,480,279 B2 | * | 11/2016 | Fogelin | .................. A47J 31/06 |
| 11,779,162 B1 | * | 10/2023 | Full | ........................ A47J 43/046 |
| | | | | 241/101.2 |
| 2015/0157049 A1 | * | 6/2015 | Fogelin | ................ B01D 33/015 |
| | | | | 210/396 |

(Continued)

OTHER PUBLICATIONS

Written Opinion issued by The USPTO for International Patent Application No. PCT/US23/82322, mailed on Mar. 22, 2024.

*Primary Examiner* — Bobby Yeonjin Kim
(74) *Attorney, Agent, or Firm* — Myers Wolin, LLC

(57) ABSTRACT

An apparatus, such as a blender, has a food container including an inner wall, a food processing tool configured to be rotated in the food container, and a scraper disposed in the food container. The scraper is movable within the food container and is configured to wipe down the inner wall towards the food processing tool.

19 Claims, 7 Drawing Sheets

(56)            References Cited

U.S. PATENT DOCUMENTS

| 2016/0045073 A1* | 2/2016 | Kozlowski .......... | A47J 43/0727 |
| | | | 366/182.1 |
| 2019/0374915 A1* | 12/2019 | Charopoulos ........ | B01F 35/121 |
| 2023/0200589 A1* | 6/2023 | Staun ................. | A47J 43/0716 |
| | | | 366/244 |

* cited by examiner

161

BLENDER

CROSS REFERENCE TO RELATED APPLICATIONS

This application claims the benefit of U.S. Provisional Patent Application No. 63/434,326, filed Dec. 21, 2022, the entirety of which is hereby incorporated by reference.

FIELD

The present disclosure relates to an apparatus with a rotatable processing tool. In particular, the present disclosure relates to a blender.

BACKGROUND

As a household device, a blender is often used to blend or mix drinks or liquids. Blender operation normally requires the user to remove a lid of a blender, insert ingredients into a container of the blender. Then, the ingredients are blended or mixed in the container by rotating a blade in the container.

During usage of a typical blender, some portion of the contents being blended will splash onto and stick to the inside walls of the blender. As such, after initially blending the contents of the container, the lid is typically removed and the contents of the walls are scraped into the blended content. The lid is then replaced and the blender is operated again to incorporate the scraped content. Sometimes, for viscous or sticky contents, this process may be repeated several times to ensure that the contents of the container are fully blended.

Typically, the lid of the blender cannot or should not be removed while the blender is operating, both to avoid risk due to the rotating blade of the blender, and to avoid contents splashing out of the container.

There is a need for a blender that can be scraped during blending, so that contents can be fully blended without repeatedly opening and closing the blender.

SUMMARY

In some embodiments, an apparatus, such as a blender, is provided that comprises a food container including an inner wall, a food processing tool configured to be rotated in the food container, and a scraper disposed in the food container. The scraper is movable within the food container and is configured to wipe down the inner wall towards the food processing tool.

In some embodiments, the scraper is in contact with the inner wall along a circumferential direction of a rotation axis of the food processing tool.

In some embodiments, the scraper includes a squeegee in contact with the inner wall and a squeegee holder that holds the squeegee, the squeegee being disposed between the squeegee holder and the inner wall.

In some such embodiments, the squeegee is formed from or includes a different material than the squeegee holder. In some embodiments, the squeegee is made of a flexible or elastic material.

In some embodiments including a squeegee, the squeegee includes a ring shape enclosing the squeegee holder.

In some embodiments including a squeegee, the squeegee holder is provided with a hole. In some such embodiments, the squeegee holder includes an inner ring portion defining such a hole.

In some such embodiments, the squeegee holder further includes an outer ring portion holding the squeegee, where the inner portion is disposed between the hole and the outer ring portion, and at least one connecting portion is provided that connects the inner ring portion and the outer ring portion and is disposed between the inner ring portion and the outer ring portion.

In some embodiments in which a squeegee holder is provided with a hole, the apparatus further includes a lid configured to cover the food container, the lid being provided with a hole. A central axis of the hole in the lid then coincides with a central axis of the hole of the squeegee holder and the hole of the lid is greater in area in a plan view than the hole of the squeegee holder.

In some such embodiments, the lid includes a funnel shape terminating at the hole of the lid.

In some embodiments in which a hole is provided, the food processing tool is configured to be rotated about a rotation axis that extends through the holes of the lid and the squeegee holder.

In some embodiments in which a hole is provided, the apparatus further includes a pressing tool configured to be inserted through the hole of the lid and engage with the hole of the squeegee holder.

In some embodiments, the inner wall includes a first section having a first height and having a substantially consistent cross section across the first height, such that the scraper has a size and shape compatible with the substantially consistent cross section and is movable within the first height of the first section.

In some such embodiments, the inner wall includes a second section located below the first section, the second section having a cross section smaller than the substantially consistent cross section of the first section. The size or shape of the scraper is incompatible with the cross section of the second section.

In some such embodiments, the food processing tool is fully contained within the second section, such that the scraper is prevented from contacting the food processing tool by the smaller cross section of the second section.

In some embodiments having first and second sections, the inner wall further includes a transition section between the first section and the second section, wherein the cross section of the inner wall tapers towards the second cross section. The scraper is then obstructed within the transitional section and is prevented from entering the second section.

In some embodiments, the apparatus includes a pressing tool configured for translating the scraper along a vertical axis of the scraper, such that use of the pressing tool translates the scraper while maintaining contact between the scraper and the substantially consistent cross section of the first section of the inner wall.

In some embodiments, the food processing tool comprises at least one blade configured to be rotated in the food container.

In some embodiments, the apparatus is a food or beverage blender.

DRAWINGS

DETAILED DESCRIPTION

Figure 1:
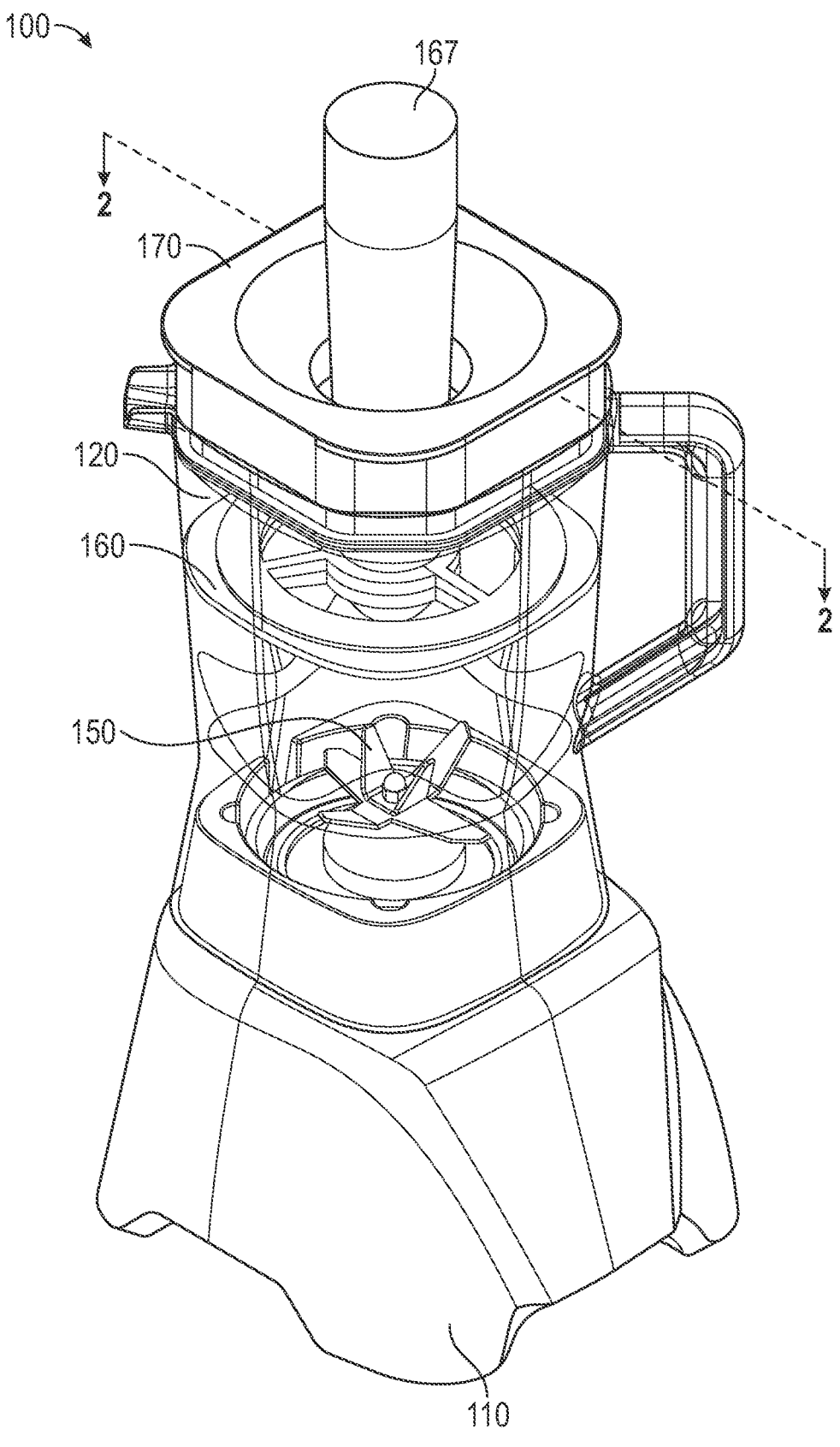
FIG. 1 shows a perspective view of an apparatus according to one embodiment.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Figure 2:
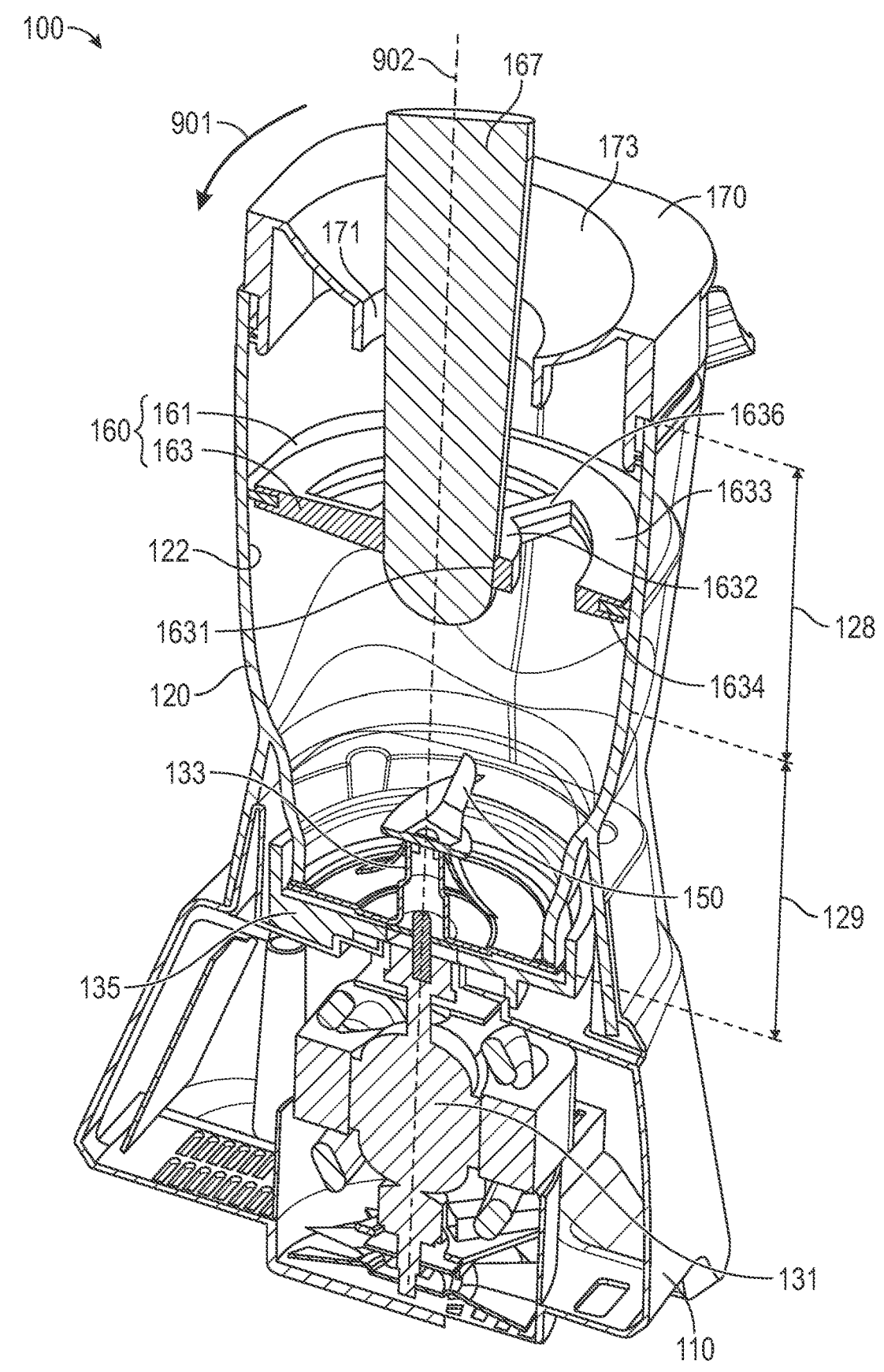
FIG. 2 shows a cross sectional view of an apparatus taken along line 2-2 in FIG. 1.

FIG. 1 shows a perspective view of an apparatus 100 according to one embodiment. FIG. 2 shows a cross sectional view of the apparatus 100 taken along line 2-2 in FIG. 1.

As shown in FIGS. 1 and 2, the apparatus 100 may be used for food processing. In some embodiments, the apparatus 100 may be a food or beverage blender. In other embodiments, the apparatus 100 may be a grinder, a chopper, a food processor, a food mill, a shredder, a mixer, a grater, a crusher, or a slicer. In the illustrated example, the apparatus 100 is a blender and may include a base 110, a food container or sidewall of a food container 120, a motor 131, a shaft 133, a bottom component 135, a food processing tool 150, and a scraper 160, and a lid 170. The base 110 may accommodate the motor 131, and other components. In some embodiments, the base 110 may include a control panel that may include one or more buttons configured to activate the motor 131.

The food container 120 may be a pitcher, or a portion of a pitcher, fitted with the food processing tool 150, and may be attached to or removably attachable to the base 110. In the illustrated example, the food container 120 may include a shape that extends upward from the base 110. The food container 120 may form at least a part of a space in which food is stored and located for processing. In the illustrated example, the food container 120 is a sidewall that encloses and defines the interior space. In such an embodiment, the sidewall of the food container 120 combines with the bottom component 135 to define the entire food container, or pitcher.

In other examples, the food container 120 may include a sidewall and a bottom of the space, thereby fully defining the container. It will be understood that the term food container as used herein can refer to the food container taking a variety of forms. As shown in FIG. 2, the food container 120 may include an inner wall 122. In the illustrated example, inner wall 122 extends upward from either a base of a food container 120 or a bottom component 135.

As shown in FIGS. 1 and 2, the scraper 160 may be disposed in the food container 120. The scraper 160 may be configured to wipe down the inner wall 122 toward the food processing tool 150. The scraper 160 may then be in contact with the inner wall 122 along a circumferential direction 901 (see FIGS. 2, 3A and 3B) of a rotation axis 902 of the food processing tool 150. The scraper 160 may include a squeegee 161 and a squeegee holder 163. The squeegee holder 163 may then be sized and shaped so as to retain pressure between the squeegee 161 and the inner wall 122 of the container 120.

Accordingly, in some embodiments, the squeegee 161 may be maintained in contact with the inner wall 122 by the squeegee holder 163. The squeegee 161 may thereby be disposed between the squeegee holder 163 and the inner wall 122. In some embodiments, the squeegee 161 includes a ring shape enclosing the squeegee holder 163. In some embodiments, the squeegee 161 may include a different material than the squeegee holder 163. Accordingly, the squeegee 161 may be made of an elastic or flexible material, such as silicone although elastic materials other than silicone may be possible. The squeegee holder 163 may then be formed from a more rigid material, so as to maintain pressure between the squeegee 161 and the inner wall 122.

The squeegee holder 163 may then hold the squeegee 161. In some embodiments, the squeegee holder 163 is provided with a hole 1631. In the illustrated example, the squeegee holder 163 may include an inner ring portion 1632, an outer ring portion 1633, and at least one connecting portion 1636. The inner ring portion 1632 may form the hole 1631. The inner ring portion 1632 is disposed between the hole 1631 and the outer ring portion 1633. The outer ring portion 1633 may hold the squeegee 161. In some embodiments, the outer ring portion 1633 may be provided with a recess 1634, in which the squeegee 161 may be disposed to be held by the recess 1634. The connecting portion 1636 may connect the inner ring portion 1632 and the outer ring portion 1633. The connecting portion 1636 may be disposed between the inner ring portion 1632 and the outer ring portion 1633.

In some embodiments, the inner wall 122 may include a first section 128 and a second section 129. The first section 128 may be located above the second section 129 in a vertical direction. The first section 128 may have a substantially consistent cross section over a dimension in a vertical direction, such that the scraper 160 passes through the first section 128. In some examples, the dimension may be, but not limited to, 3-10 cm, 4-9 cm, or 5-8 cm. The second section 129 may then be located between the first section 128 and the base 110 in the vertical direction. The second section 129 may have a cross section smaller in area than the cross section of the first section 128, such that the scraper 160 does not pass through the second section 129, and may itself have an inconsistent internal cross section, such as a taper. In some embodiments, the bottom component 135 may be disposed between the base 110 and the food container 120 or may be integrated into the food container as a base. The bottom component 135 and the food container 120 may form a bottom of the space in which food is stored. A seal may be disposed between the bottom component 135 and the food container 120.

The scraper 160 is typically sized so as to coordinate with the substantially consistent cross section of the first section 128. Accordingly, the squeegee holder 163 typically has an outer circumference smaller than the substantially consistent cross section, while the flexible squeegee 161 has am outer circumference similar to or slightly larger than the substantially consistent cross section. Accordingly, during use, the squeegee 161 fills a radial gap between the squeegee holder 163 and the inner wall 122 of the first section 128. The cross section of the first section 128 need not be entirely consistent, and may taper somewhat towards the second section 129. However, the variance between the largest and smallest cross sectional circumference of the first section 128 is small enough that the scraper 160 can pass through the entire space. As such, the smallest cross sectional circumference of the first section 128 is larger than the outer circumference of the squeegee holder 163, while the largest cross sectional circumference of the first section 128 is smaller than the outer circumference of the squeegee 161.

It is further noted that the cross section of the container 120 need not be circular. As shown in the drawings, the cross section may be a rounded square or rectangle tapering towards the food processing tool 150. In some such embodiments, the second section 129 of the container 120 may taper towards a circular shape, so as to funnel contents towards the food processing tool 150.

Figure 4A:
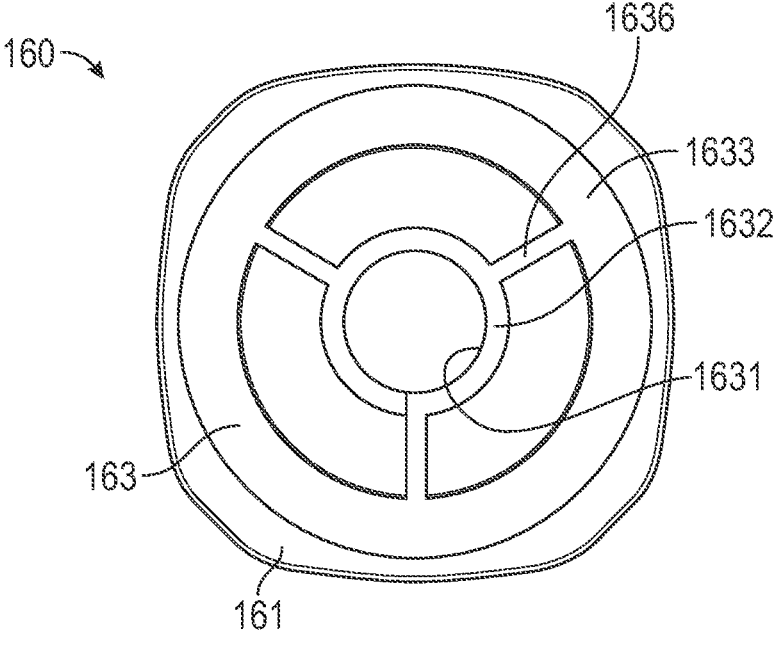
FIG. 4A shows a top plan view of a scraper according to one embodiment.
Figure 4B:
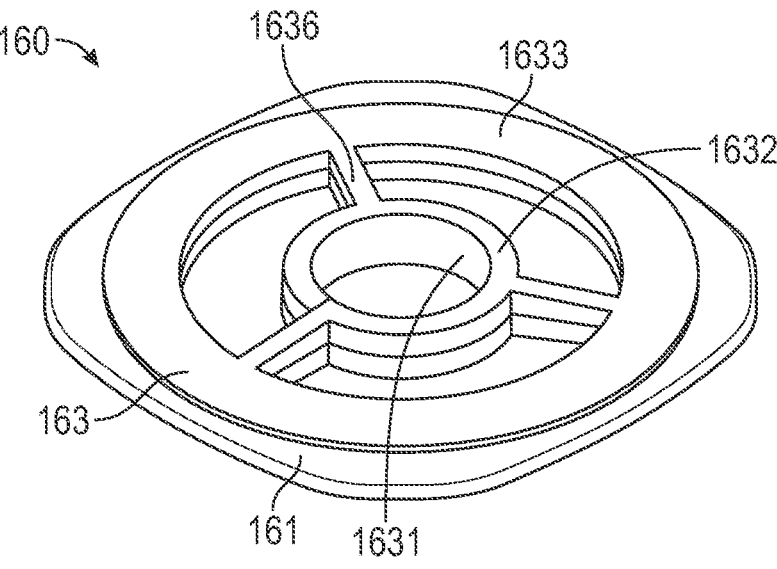
FIG. 4B shows a perspective view of a scraper according to one embodiment.
Figure 4C:
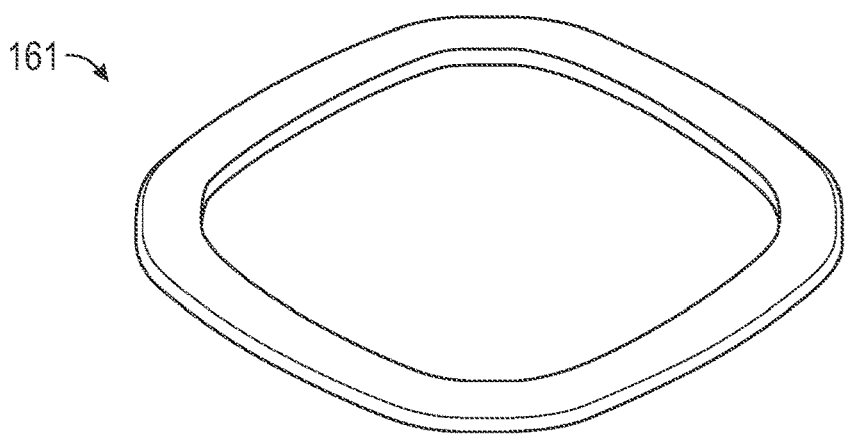
FIG. 4C shows a perspective view of a squeegee according to one embodiment.

Accordingly, the scraper 160 may be shaped to conform to the container 120. The squeegee 161 itself may then be provided with a rounded square shape, as shown in FIG. 4C, to correspond to the cross sectional profile of the first section 128 of the container 120. The squeegee holder 163 may then be adapted to maintain the shape of the squeegee 161 either by having an equivalent shape or, as in the embodiment shown, having a core 1638 defining the shape of the recess 1634 that conforms to the shape of the squeegee 161 and the cross sectional profile of the first section 128.

In some embodiments, the second section 129 is configured such that the scraper 160 is prevented from entering. Accordingly, the size or shape of the scraper 160 may be incompatible with the cross section of the second section. The food processing tool 150 may then be fully contained within the second section 129 such that the scraper 160 is prevented from contacting the food processing tool by the smaller cross section of the second section.

In some such embodiments, the food processing tool 150 may be fully contained within the second section 129.

Accordingly, the scraper 160 is prevented from contacting the food processing tool by the smaller or differently shaped cross section of the second section 129 of the container 120.

In some embodiments, the inner wall 122 may further comprise a transitional section between the first section 128 to the second section 129. Such a transitional section may allow for the cross section of the inner wall 122 to taper towards the cross section of the second section 129. The scraper 160 may then be obstructed within the transitional section and be prevented from entering the second section 129. The transitional section may also allow for the second section 129 to have a substantially consistent cross section different from that of the first section 128 by providing a knuckle in the shape of the inner wall 122 between the two sections. In some embodiments, rather than having a discrete transitional section, the transition may be considered part of the second section 129, as the second section does not necessarily have a substantially consistent cross section.

With reference to FIG. 2, the motor 131 may be disposed in the base 110, and the shaft 133 and the food processing tool 150 may be disposed in the food container 120. The motor 131 may be connected to the food processing tool 150 via the shaft 133, and may be configured to rotate the food processing tool 150 via the shaft 133. As such, the food processing tool 150 may be configured to be rotated in the food container 120 about the rotation axis 902. Accordingly, the bottom component 135 or the bottom of the food container 120 may be configured to accommodate the shaft 133 while maintaining a seal sufficient for the container 120 to retain liquid.

In some embodiments, the food processing tool 150 may include at least one blade configured to be rotated in the food container 120. In some examples, the blade may be designed for food processing, such as blending of food, cutting of food, hopping of food, grinding of food, crushing of food, mixing of food, or combination thereof. In some embodiments, the food processing tool 150 may be permanently attached to the shaft 133, and the shaft may be removably mated to the motor 131 so that the food container 120 can be removed with the shaft 133. However, in other embodiments, the food processing tool 150 may be detachably attached to the shaft 133, such that the shaft retains its connection with the motor 131 when the food container 120 is removed.

In the embodiment shown, the apparatus 100 is a blender, and the food processing tool 150 may be a blade or set of blades incorporated into the bottom component 135, such that the shaft is fixed to the food processing tool 150. Alternatively, the described assembly may be a food processor or other appliance, and may instead be fitted with a removable or interchangeable blade.

Figure 3A:
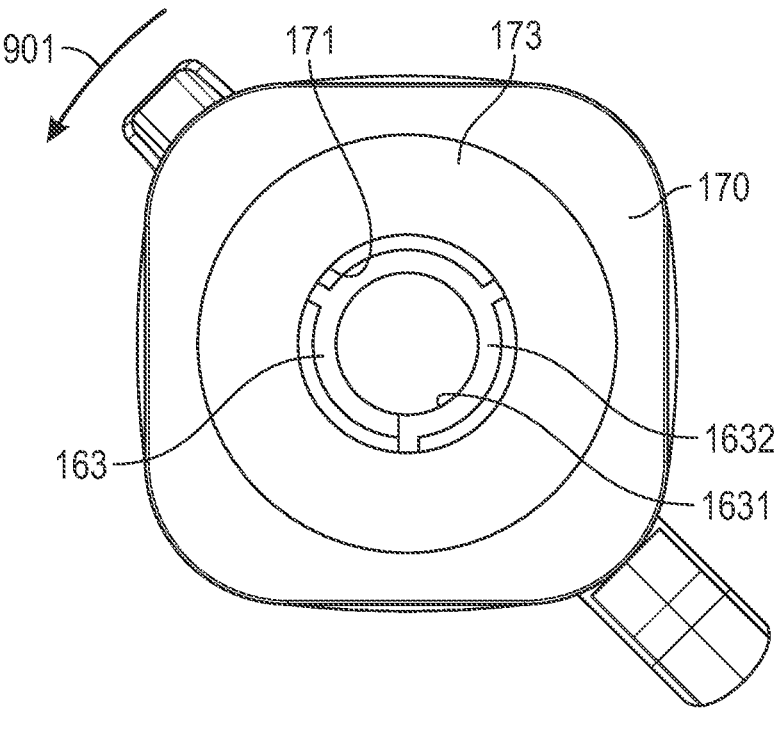
FIG. 3A shows a top plan view of an apparatus according to one embodiment.
Figure 3B:
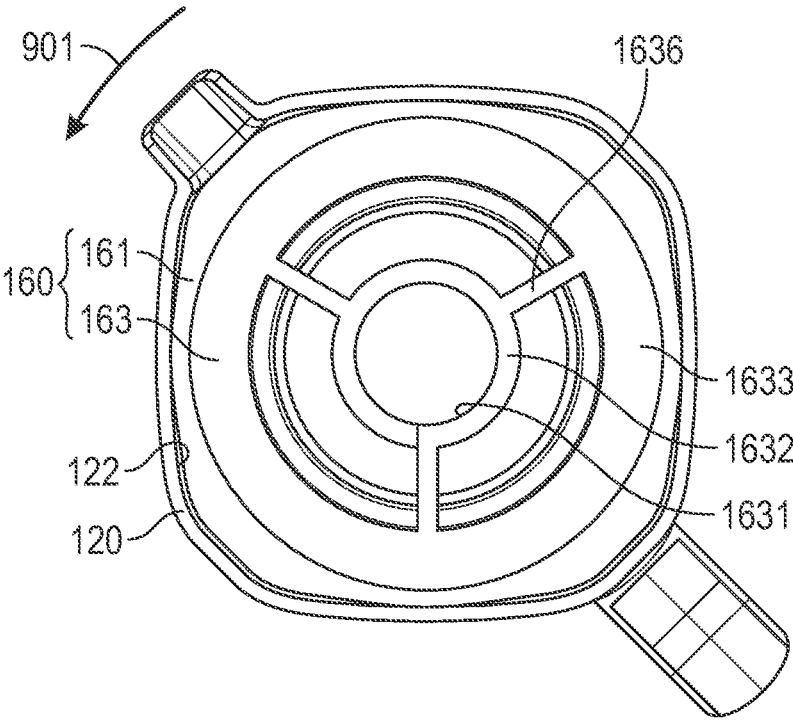
FIG. 3B shows a top plan view of an apparatus according to one embodiment with a lid being omitted.
Figure 4D:
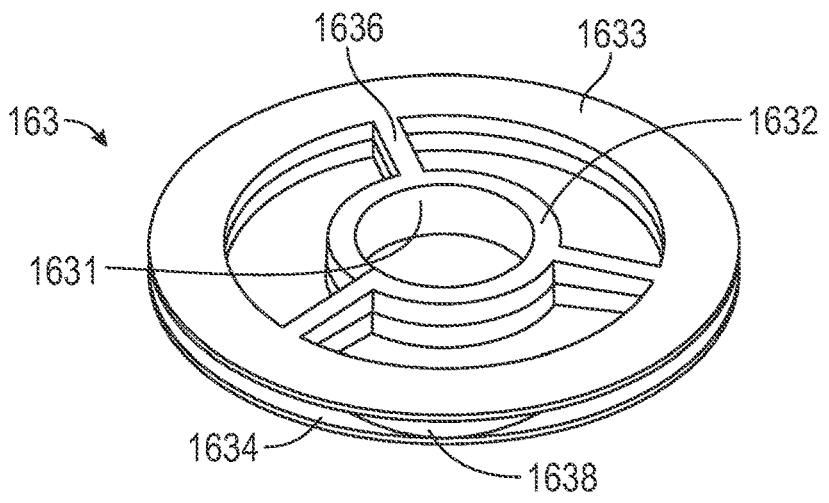
FIG. 4D shows a perspective view of a squeegee holder according to one embodiment.

FIG. 3A shows a plan view of an apparatus 100 according to one embodiment. FIG. 3B shows a plan view of an apparatus 100 according to one embodiment with a lid 170 being omitted. FIG. 4A shows a plan view of the scraper 160 according to one embodiment. FIG. 4B shows a perspective view of a scraper 160 according to one embodiment. FIG. 4C shows a perspective view of a squeegee 161 according to one embodiment. FIG. 4D shows a perspective view of a squeegee holder 163 according to one embodiment.

Figure 4E:
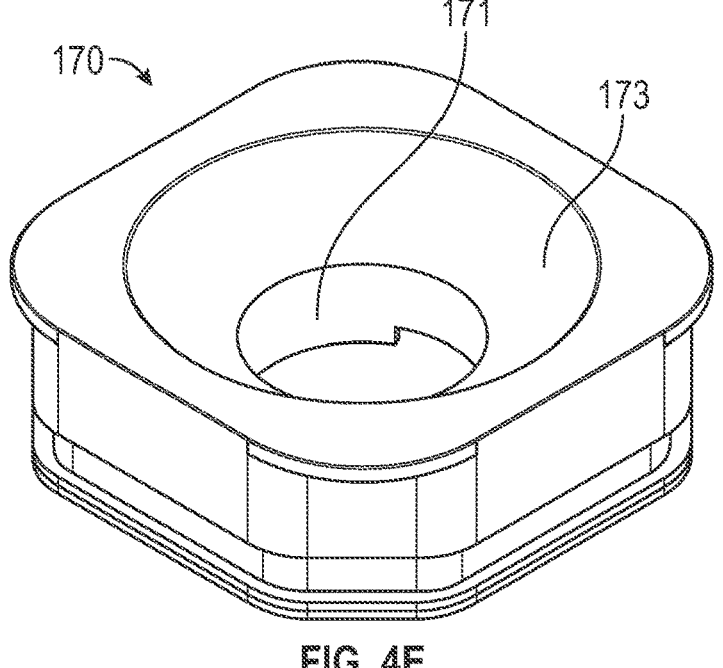
FIG. 4E shows a perspective view of a lid according to one embodiment.

FIG. 4E shows a perspective view of a lid 170 according to one embodiment.

With reference to FIGS. 2, 3A, 4E, the lid 170 may be configured to cover the food container 120. In some embodiments, the lid 170 may be provided with a hole 171. As shown in FIG. 3A, the hole 171 of the lid 170 may overlap with the hole 1631 of the squeegee holder 163 in a plan view.

In other words, a central axis of the hole 171 of the lid 170 may coincide with a central axis of the hole 1631 of the squeegee holder 163. In the illustrated example of FIG. 3A, the hole 171 of the lid 170 may overlap the entirety of the hole 1631 of the squeegee holder 163 in the plan view. In one example, the hole 171 of the lid 170 may be greater in area or radius than the hole 1631 of the squeegee holder 163.

As shown in FIG. 2, the rotation axis 902 of the food processing tool 150 may extend through the hole 171 of the lid 170 and the hole 1631 of the squeegee holder 163. In some embodiments, the lid 170 may include a funnel shape 173 forming and terminating at the hole 171 of the lid 170. The apparatus 100 may further include a pressing tool 167 configured to be inserted through the hole 171 of the lid 170, and be engaged with the hole 1631 of the squeegee holder 163. In some embodiments, the pressing tool 167 may be detachably or permanently attached to the scraper 160. By moving the pressing tool 167 downward and upward, the scraper 160 may be moved downward and upward with the scraper 160 being kept in contact with the inner wall 122 of the food container 120.

Figure 5:
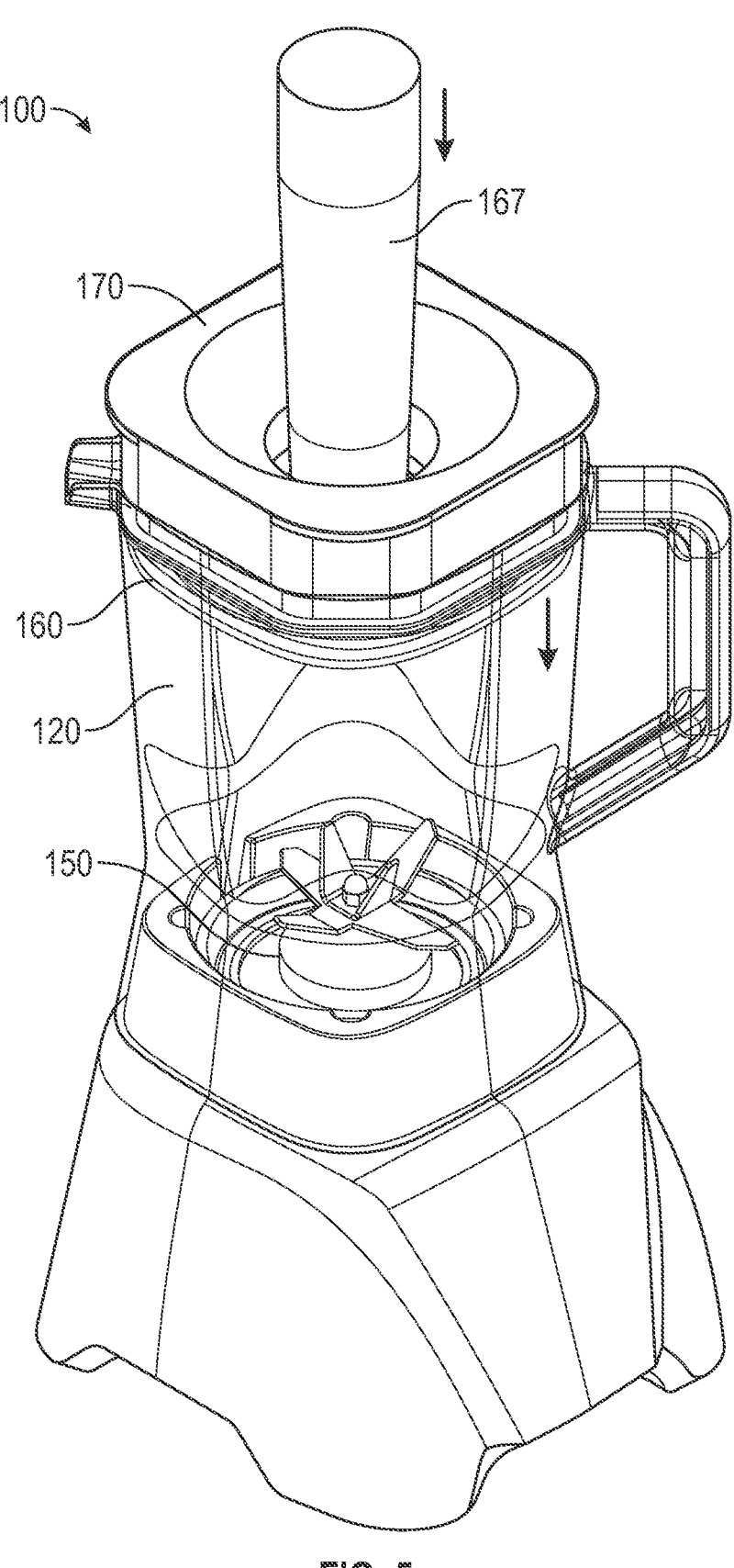
FIG. 5 shows a perspective view of use of an apparatus according to one embodiment.
Figure 6:
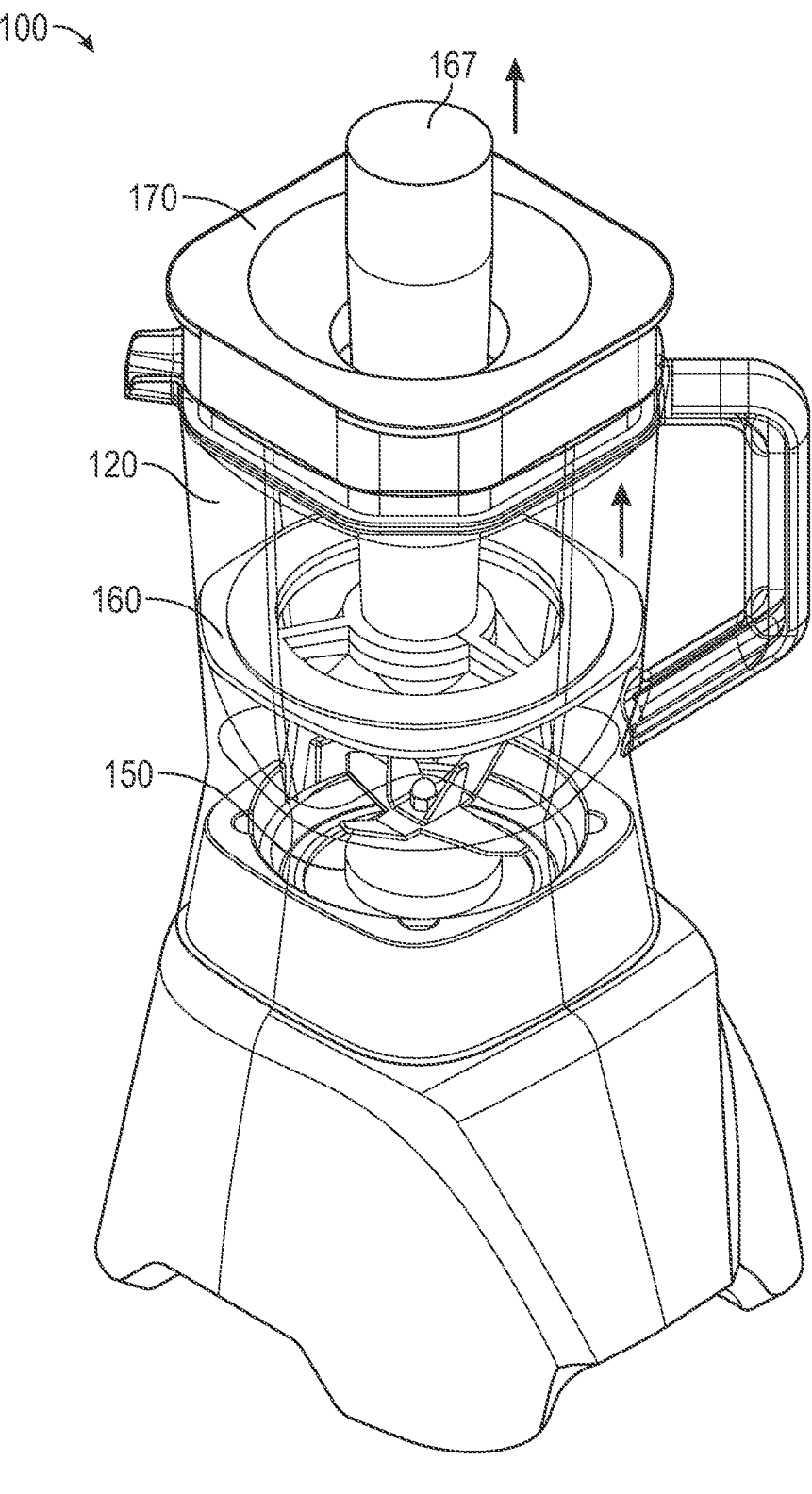
FIG. 6 shows another perspective view of use of an apparatus according to one embodiment.

FIG. 5 shows a perspective view of use of an apparatus according to one embodiment. FIG. 6 shows another perspective view of use of an apparatus according to one embodiment.

When the apparatus 100 is used, food may be placed in the food container 120. As shown in FIG. 5, the user may press down the pressing tool 167 to move down the scraper 160. The pressing tool 167 is then configured for translating the scraper 160 along a vertical axis of the scraper, such that use of the pressing tool translates the scraper while maintaining contact between the scraper and the substantially consistent cross section of the first section 128 of the inner wall 120. As such, the scraper 160 may wipe down the inner wall 122 toward the food processing tool 150. Therefore, food substance stuck to the inner wall 122 of the food container 120 may be loosened and pushed toward the food processing tool 150 (e.g., a blade) to facilitate food processing. In some embodiments, the inner wall 122 may include the first section 128 having the consistent cross section, and, in such a case, the scraper 160 may pass through the first section 128. In some embodiments, the inner wall 122 may include the second section 129 having the cross section smaller in area than the cross section of the first section 128, and, in such a case, the scraper 160 may not pass through the second section 129, as discussed above. Then, as shown in FIG. 6, the user may pull up the pressing tool 167 to move up the scraper 160. Then, the user may repeat the processes shown in FIGS. 5 and 6.

Accordingly, the apparatus 100 may include the scraper 160 disposed in the food container 120. The scraper 160 may be configured to wipe down the inner wall 122 toward the food processing tool 150. Therefore, the apparatus 100 may remove food substance stuck to the inner wall 122 to reduce food substance that is not sufficiently processed.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. An apparatus, comprising:
   a food container including an inner wall;
   a food processing tool configured to be rotated in the food container; and
   a scraper disposed in the food container, the scraper being movable within the food container and configured to wipe down the inner wall toward the food processing tool,
   wherein the inner wall includes a first section having a first height and having a substantially consistent cross section across the first height, such that the scraper has a size and shape compatible with the substantially consistent cross section and is movable within the first height of the first section, and
   wherein the inner wall includes a second section located below the first section and not below the food processing tool, the second section having a cross section smaller than the substantially consistent cross section of the first section, such that the size or shape of the scraper is incompatible with the cross section of the second section.

2. The apparatus of claim 1, wherein the scraper is in contact with the inner wall along a circumferential direction of a rotation axis of the food processing tool.

3. The apparatus of claim 1, wherein the scraper includes:
   a squeegee in contact with the inner wall; and
   a squeegee holder that holds the squeegee, the squeegee being disposed between the squeegee holder and the inner wall.

4. The apparatus of claim 3, wherein the squeegee includes a different material than the squeegee holder.

5. The apparatus of claim 3, wherein the squeegee is made of a flexible or elastic material.

6. The apparatus of claim 3, wherein the squeegee includes a ring shape enclosing the squeegee holder.

7. The apparatus of claim 3, wherein the squeegee holder is provided with a hole.

8. The apparatus of claim 7, wherein the squeegee holder includes an inner ring portion defining the hole.

9. The apparatus of claim 8, wherein the squeegee holder includes:
   an outer ring portion holding the squeegee, wherein the inner ring portion is disposed between the hole and the outer ring portion, and
   at least one connecting portion that connects the inner ring portion and the outer ring portion and is disposed between the inner ring portion and the outer ring portion.

10. The apparatus of claim 7, further comprising a lid configured to cover the food container, the lid being provided with a hole,
    wherein a central axis of the hole of the lid coincides with a central axis of the hole of the squeegee holder, and
    wherein the hole of the lid is greater in area in a plan view than the hole of the squeegee holder.

11. The apparatus of claim 10, wherein the lid includes a funnel shape terminating at the hole of the lid.

12. The apparatus of claim 10, wherein the food processing tool is configured to be rotated about a rotation axis extending through the holes of the lid and the squeegee holder.

13. The apparatus of claim 10, further comprising a pressing tool configured to be inserted through the hole of the lid and engage with the hole of the squeegee holder.

14. The apparatus of claim 1, wherein the food processing tool is fully contained within the second section, such that the scraper is prevented from contacting the food processing tool by the smaller cross section of the second section.

15. The apparatus of claim 1, wherein the inner wall comprises a transition section between the first section and the second section, wherein the cross section of the inner wall tapers towards the second cross section, such that the scraper is obstructed within the transitional section and is prevented from entering the second section.

16. The apparatus of claim 1, further comprising a pressing tool configured for translating the scraper along a vertical axis of the scraper, such that use of the pressing tool translates the scraper while maintaining contact between the scraper and the substantially consistent cross section of the first section of the inner wall.

17. The apparatus of claim 1, wherein the food processing tool comprises at least one blade configured to be rotated in the food container.

18. The apparatus of claim 1, wherein the apparatus is a food or beverage blender.

19. An apparatus, comprising:

a food container including an inner wall;

a food processing tool configured to be rotated in the food container; and a scraper disposed in the food container, the scraper being movable within the food container and configured to wipe down the inner wall toward the food processing tool, wherein the scraper includes:

a squeegee in contact with the inner wall; and a squeegee holder that holds the squeegee, the squeegee being disposed between the squeegee holder and the inner wall, wherein the squeegee holder is provided with a hole, wherein the apparatus further comprises a lid configured to cover the food container, the lid being provided with a hole, wherein a central axis of the hole of the lid coincides with a central axis of the hole of the squeegee holder, and wherein the hole of the lid is greater in area in a plan view than the hole of the squeegee holder.

* * * * *